Patented Aug. 11, 1942

2,292,390

UNITED STATES PATENT OFFICE 2,292,390

METHOD OF TREATING LIGNOCELLULOSIC MATERIAL TO PRODUCE MOLDABLE PRODUCTS

John G. Meiler, Wausau, Wis., assignor to Marathon Paper Mills Company, Rothschild, Wis., a corporation of Wisconsin No Drawing. Application November 19, 1941, Serial No. 419,787

10 Claims. (Cl. 106—123)

The present invention relates to improvements in a process for treating lignocellulosic material such as wood and the like in order to convert same into products useful for molding purposes. The invention also relates to new and useful products made by said method.

The present invention contemplates treating lignocellulose materials with an aqueous alkaline solution of predetermined concentration containing a lignin-sulphonic acid compound and digesting the treated materials under controlled conditions of pH, temperature and time of cooking so as to produce a product having the desired plasticity and flow suitable for molding under heat and pressure.

In accordance with my invention, lignocellulosic material such as wood is digested with an aqueous alkaline solution containing a lignin sulphonic-acid compound for a relatively short period of time until the acids developed neutralize the alkaline material, and thereafter the digestion is continued under acid conditions for a relatively long period of time as compared with the aforesaid alkaline digestion period. During the digestion, precipitation of partially desulphonated lignin-sulphonic acid compounds occurs, and the material acquires the desired conditions of plasticity and flow suitable for molding under heat and pressure to form a product of high wet and dry strength and low water absorption.

The total period of digestion is largely dependent upon the temperature and pressure utilized. With a comparatively low temperature and pressure, say with a temperature in the order of about 170° to 200° C. and a pressure in the order of about 200 pounds per square inch, the total period of digestion may be in the order of about 2 hours. With a comparatively higher temperature and pressure, say with a temperature approximately corresponding to a pressure of steam of about 1000 pounds per square inch, the total period of digestion may be in the order of about 3½ minutes. In general, conditions of temperature and pressure are so controlled that the total digestion period does not exceed about 2½ to 3 hours, although I prefer that the digestion be completed within a considerably shorter period of time.

During this total digestion period, the lignocellulosic material is digested under alkaline conditions for a portion of the time and then under acid conditions for the remainder of the time. In all instances, the digestion is carried out under acid conditions for a major portion of the time. The alkaline material safeguards the cook from becoming too acid and thus assists in assuring that the digested material will be capable of being molded under heat and pressure to form the desired strong, tough, non-brittle product.

The quantity of alkaline material sufficient for my purpose varies with the character of the lignocellulosic material used. In general, the quantity of alkaline material used is such that when the lignocellulose material is digested as aforesaid, the acidity of the completed cook has a pH below 7, preferably in the order of about 6.5 and lower as hereinafter described. I prefer to use a quantity of soluble alkaline material equivalent to that of about 3% to about 8 or 9% of sodium hydroxide, based on the air dry weight of the lignocellulose material, the equivalency to be determined by cooking with an alkaline solution containing a lignin-sulphonic compound of such an alkalinity as will give a final pH of the digesting materials in the range 4.5 to 7.0. Smaller amounts may be used, if desired, say down to an amount equivalent to that of about 1% of sodium hydroxide, based on the air dry weight of the lignocellulose material. Larger amounts should be avoided, in general, since any appreciably larger amount of alkaline material in excess of the upper limit above stated will for given cooking conditions decrease the plasticity of the material and the resulting molded products will have a higher water absorption. In addition, large amounts of alkaline material above the limits stated prevent the completion of the digestion in a commercially feasible time.

The conditions of temperature, pressure and time can be controlled readily, for a given lignocellulosic material and a given amount of alkaline material in the aqueous vehicle containing the lignin-sulphonic acid compound, to produce a final molded product having the desired balance of strength and water-resistance suitable for commercial purposes. An important factor necessary to achieve this purpose is the control of the quantity of alkaline material used. The desired moldable product may be formed by controlling the quantity of alkaline material to an amount sufficient to be neutralized by the acids developed during digestion and to produce in the digesting materials an acid pH range between about 4, preferably 4.5, on one hand, and below 7, preferably 6.5, on the other, and by further controlling this quantity to insure that the alkaline material is completely neutralized by the acids developed in a relatively short period of the total digestion time, and to permit of the precipitation of a partially desulphonated lignin sulphonic acid compound.

I have found after considerable experimentation that it is desirable to limit the digestion treatment so as to avoid an acidity substantially greater than that represented by pH of about 4.5 in order to secure products of commercial uniformity and superior usefulness and that within the preferred pH range of about 4.5 to 6.5 a higher temperature of treatment during the cooking process can be used to advantage.

In general, most lignin-sulphonic acid compounds are suitable for use in my process but for economic and other reasons some of such compounds are preferred to others. Waste sulphite liquor resulting from the making of paper pulp by the sulphite process is a convenient source of lignin-sulphonic acid compounds and such liquors can be made alkaline suitably with caustic soda, sodium carbonate or other readily soluble alkaline compounds to give alkaline reactions in aqueous solution, and used to digest ligno-cellulose in accordance with my invention. If desired, a part of the calcium present in the original waste sulphite liquor may be precipitated and removed as insoluble calcium salts, e. g., calcium sulphite, calcium sulphate, etc., by reaction with suitable reagents. Complete removal of calcium is undesirable since calcium tends to make partially desulphonated lignin-sulphonic acid compounds less soluble in water and hence more completely precipitatable. Such waste liquors, however, contain substantial amounts of non-ligneous organic matter which are not essential for my purpose and I prefer as a starting material the basic lignin-sulphonic acid compounds substantially freed from non-ligneous organic matter as produced by the procedure of United States Patent Reissue 18,268, December 1, 1931, to Howard, and which are converted into the corresponding sodium compounds in accordance with Patents 2,057,117 and 2,104,701.

It is desirable, however, to use a less highly sulphonated lignin material than the sodium salt of the basic lignin-sulphonic acid compounds as thus obtained since such compounds are too highly sulphonated and must be desulphonated during the alkaline period of the digestion to an extent sufficient to render them partially or wholly insoluble under acid conditions in the digesting liquor. I have therefore found that it is advantageous to use alkaline solutions of partially desulphonated lignin-sulphonic acid compounds, such for example as some of the intermediate products resulting from the procedure of United States Patent 2,057,117, October 13, 1936, to Sandborn et al., or some of the alkaline liquors resulting from the procedures disclosed in Patent 2,104,701, January 4, 1938, to Sandborn, in which alkaline solutions of partially desulphonated lignin-sulphonic acid compounds are produced. These alkaline liquors before extraction with the solvent as disclosed in Sandborn Patent 2,104,701, will hereinafter be referred to as "unextracted alkaline liquor." The alkaline liquors after extraction as disclosed in the same patent are hereinafter designated as "extracted alkaline liquor." I may however use the alkaline solutions as described in Patent 2,057,117 which contain the sodium salts of highly sulphonated lignin-sulphonic acid compounds prior to the heat and pressure treatment as described therein whereby the lignin-sulphonic acid compounds are partially desulphonated, but this necessitates some desulphonation during the alkaline period of the digestion. Such alkaline solutions are hereinafter referred to as "undigested alkaline liquor."

When the "extracted alkaline liquor" is used the material precipitated from it is principally a compound of lignin-sulphonic acid. When the "unextracted alkaline liquor" is used, vanillin and other compounds extractable by the organic solvent may also be precipitated or may react with the lignocellulose or with the products obtained from its during the digestion. When the "undigested alkaline liquor" is used some desulphonation occurs during its digestion with the lignocellulose to produce an acid-insoluble material which precipitates in situ.

The new and useful products resulting from my invention are therefore essentiatlly a composition of the insoluble digestion products resulting from partially hydrolizing lignocellulose materials and insoluble partially desulphonated lignin-sulphonic acid compounds. Among the advantages of the invention are that the presence of such lignin-sulphonic acid compounds in the alkaline digestion liquors aids in buffering the digesting liquor, thus preventing a too rapid lowering of the pH during the digestion, and that the partially desulphonated lignin-sulphonic acid compounds are partially or wholly precipitated. These precipitated lignin-sulphonic acid compounds function as a resin constituent in the mixture and serve to increase the resin effect with its resulting benefits as regards moldability of the material and properties of the resulting molded product.

In order that the invention may be better understood, the following examples are given as illustrative procedures:

*Example 1.*—A charge consisting of 100 pounds dry weight of hardwood chips containing 40% moisture and 55 gallons of "extracted alkaline liquor" is placed in a rotating digester. After the digester is rotated three times, the liquor is drained off. To facilitate drainage and to increase penetration the pressure in the digester is increased by direct steam. After drainage has stopped the charge is then raised to the digesting temperature of about 200° C. with direct steam. The following is a tabular summary of the digestion data:

| Time, minutes | Temperature of charge, centigrade | Pressure in digester, lbs./sq. in. | pH of cooking liquor |
|---|---|---|---|
| 0 | 50 | 0 | |
| 10 | | 225 | |
| 20 | | 225 | |
| 50 | 200 | 225 | 8.0 |
| 80 | 200 | 225 | 5.4 |
| 90 | 195 | 220 | |
| 105 | | | 5.1 |

Digester vented and pressure reduced to 0. Final pH, 5.05.

*Example 2.*—A charge consisting of 4 pounds dry weight of hardwood sawdust containing 35% moisture and 4 pounds of "extracted alkaline liquor" is mixed in a rod mill. The mixture is then placed in a digester and the pressure is raised with live steam to about 600 pounds per square inch in 30 seconds, then increased to about 1,000 pounds per square inch in 5 seconds and maintained at that pressure for 90 seconds, when the digester is immediately blown, the final pH being about 6.0.

*Example 3.*—A charge consisting of 4 pounds dry weight of hardwood sawdust containing 35% moisture and 3 pounds of "undigested alkaline liquor" is mixed in a rod mill, and the impregnated sawdust is then charged into the digester. The pressure in the digester is raised by live steam to about 600 pounds per square inch in 30 seconds, then increased to about 1,000 pounds per square inch in 5 seconds and maintained at that pressure for 90 seconds when the digester is immediately blown, the final pH being about 5.8.

These examples not only illustrate the optional procedures of the digesting operation, but they also show the effect of high temperature digestion. In Example 1, where the digestion was carried out at about 200° C., it was necessary to continue the digestion until the pH reached about 5.05 in order to obtain a product satisfactory for molding. On the other hand, in the last two examples where the digestion was carried out at about 285° C. a pH of about 6.0 was found low enough to produce a product satisfactory for molding.

I have also found that by impregnating the subdivided lignocellulosic material with the aqueous alkaline solutions of lignin-sulphonic acid compounds preparatory to cooking, I am able to use more concentrated solutions and that the use of more concentrated solutions together with the action of steam increases the plasticity of the product and facilitates subsequent operations by retaining the resin within the digested material.

In accordance with this invention it is possible to increase and control the resin content of the resulting digested material by the use of these various alkaline solutions of lignin-sulphonic acid compounds. The extent of the ligneous or resinous enrichment will depend largely upon the amount of alkaline solutions of lignin-sulphonic acid compounds used. For instance, in Example 2 the amount of such solution used is equal to the dry weight of the wood and this liquor contains about 15–20% of lignin-sulphonic acid compound capable of being precipitated by acid. Under the conditions of such digestions about 60–90% of this lignin-sulphonic acid compound is precipitated and I thus increase the amount of resinous material in the digested mass by about 12–18% of the weight of the original wood. However, since a very appreciable amount of the wood decomposes into water soluble material during the digestion, the actual increase in resin content due to this ligneous or resinous enrichment will amount to about 20 to 35% of the weight of the digested product. The actual increase in the amount of resin by the procedures of the present invention may easily amount to 50–100% and in special cases even more. This invention therefore provides a very effective and efficient method of increasing the resin content of materials in accordance with my invention. In addition to these advantages such resin enrichment is economical in that it results in an increased yield of product based on the lignocellulose used.

After the product of the digestion is washed, it may be air dried and ground, or first ground and then air dried to a moisture content of from about 2 to 10% by weight of dry product, and the resultant product used as a molding composition, or the washed product may be refined in the paper-making sense to form a pulp which is formed into sheets of suitable thickness by known methods. The sheeted product containing a controlled amount of moisture or other suitable plasticizer may be molded singly or may be made into laminated molded articles in the usual way by subjecting the sheets to suitable heat and pressure.

In order to produce a product suitable for molding under heat and pressure it is necessary that the product produced by my process contain a plasticizer. Water serves as a satisfactory plasticizer when present in amounts from about 2.0% to 10% by weight of the dry product. The product produced in accordance with my process may be completely dried after washing and then water may be added in amounts from about 2 to 10% by weight of the dry product to serve as plasticizer, or the washed product of the digestion may be air dried to a desired moisture content from about 2 to 10% by weight of the dry product. Resins, fillers, pigments, and other suitable plasticizers, such as mono and polyhydroxy alcohols, e. g., ethyl alcohol, glycol, glycerine, etc.; phenols, e. g., phenol, xylenol, etc.; and other hydroxy compounds and solvents for the ligneous resin, e. g., acetone, cellosolve (ethylene glycol monoethyl ether) etc., may be incorporated into the washed, ground, or refined product in any suitable amounts, preferably from about 2 to 10% by weight of the dry product.

The plasticity of the sheeted product or of the molding composition may be readily controlled by regulating the amount of moisture or other plasticizer in the product during the molding operation. In general it is desirable to work with a low moisture content, best results being ordinarily obtained between the range of about 3.5–7% moisture based on the weight of dry product. The molding composition usually requires a slightly higher water content than is necessary with the corresponding sheeted product.

My molding composition comprises the partially hydrolyzed lignocellulose material as its major constituent and the partially desulphonated lignin-sulphonic acid compound precipitated on the lignocellulose material as a minor constituent together with a suitable plasticizing agent. It has the necessary plasticity and flow suitable for molding under heat and pressure to produce hard, dense, strong, water-resistant dark colored products having a high wet and dry strength and low water absorption. The molded products thus have the desired balance of strength and water-resistance suitable for commercial purposes.

It is to be understood that numerous changes and modifications may be made in the process and product produced thereby without departing from the spirit of the invention and it is intended to broadly include such variations and modifications as defined in the appended claims except as they may be restricted by the prior art.

This application is a continuation-in-part, of my copending application Serial No. 183,828, filed January 7, 1938.

I claim:

1. The process of treating lignocellulose material to make a product capable of being molded under heat and pressure in the presence of a plasticizer to form a product having high wet and dry strength and low water absorption which comprises digesting lignocellulose material under an elevated temperature and pressure with an alkaline aqueous solution containing a lignin-sulphonic acid compound and a predetermined amount of a readily soluble alkaline material sufficient to be neutralized by the acids developed during the digestion and to permit of the attainment of an acidity in the digesting material in a range extending between about pH 4.5 and 7.0 for a relatively long portion of the total digestion period and to precipitate a partially desulphonated lignin-sulphonic acid compound during the digestion, the amount of the alkaline material being such that it is completely neutralized by the acids developed during the digstion in a relatively short portion of the total digestion time, washing and drying the resultant solid product.

2. The process of treating lignocellulose material to make a product capable of being molded under heat and pressure in the presence of a plasticizer to form a product having high wet and dry strength and low water absorption which comprises digesting lignocellulose material under an elevated temperature and pressure with an alkaline aqueous solution containing a partially desulphonated lignin-sulphonic acid compound and a predetermined amount of caustic soda sufficient to be neutralized by the acids developed during the digestion and to permit of the attainment of an acidity in the digesting material in a range extending between about pH 4.5 and 7.0 for a relatively long portion of the total digestion period and to permit of the precipitation of a partially desulphonated lignin-sulphonic acid compound during the digestion, the amount of the alkaline material being such that it is completely neutralized by the acids developed during the digestion in a relatively short portion of the total digestion time not below about 4.5, washing and drying the resultant solid product.

3. The process of treating lignocellulose material to make a product capable of being molded under heat and pressure in the presence of a plasticizer to form a product having high wet and dry strength and low water absorption which comprises digesting lignocellulose material under an elevated temperature and pressure with an alkaline aqueous solution containing a partially desulphonated lignin-sulphonic acid compound and a predetermined amount of a readily soluble alkaline material sufficient to be neutralized by the acids developed during the digestion and to permit of the attainment of an acidity in the digesting material in a range extending between about pH 4.5 and 7.0 for a relatively long portion of the total digestion period and to permit of the precipitation of a partially desulphonated lignin-sulphonic acid compound during the digestion, the amount of the alkaline material being such that it is completely neutralized by the acids developed during the digestion in a relatively short portion of the total digestion time, washing and drying the resultant solid product.

4. The process of treating lignocellulose material to make a product capable of being molded under heat and pressure in the presence of a plasticizer to form a product having high wet and dry strength and low water absorption which comprises digesting lignocellulose material under an elevated temperature and pressure with an alkaline aqueous solution containing a partially desulphonated lignin-sulphonic acid compound and a predetermined amount of a readily soluble alkaline material sufficient to be neutralized by the acids developed during the digestion and to permit of the attainment of an acidity in the digesting material in a range extending between about pH 4.5 and 7.0 for a relatively long portion of the total digestion period and to permit of the precipitation of a partially desulphonated lignin-sulphonic acid compound during the digestion, the amount of the alkaline material being such that it is completely neutralized by the acids developed during the digestion in a relatively short portion of the total digestion time, subdividing and washing the resultant product, and drying the product to a moisture content of from about 2 to 10% by weight of dry product.

5. The process of treating lignocellulose material to make a product capable of being molded under heat and pressure in the presence of a plasticizer to form a product having high wet and dry strength and low water absorption which comprises digesting lignocellulose material under an elevated temperature and pressure with an alkaline aqueous solution containing a partially desulphonated lignin-sulphonic acid compound and a predetermined amount of a readily soluble alkaline material sufficient to be neutralized by the acids developed during the digestion and to permit of the attainment of an acidity in the digesting material in a range extending between about pH 4.5 and 7.0 for a relatively long portion of the total digestion period and to permit of the precipitation of a partially desulphonated lignin-sulphonic acid compound during the digestion, the amount of the alkaline material being such that it is completely neutralized by the acids developed during the digestion in a relatively short portion of the total digestion time, washing the resulting material, drying, and adding thereto about 2 to 10% of a plasticizer by weight of dry material.

6. A composition moldable under heat and pressure which comprises a partially hydrolyzed lignocellulose material as its major constituent, a partially desulphonated lignin-sulphonic acid compound precipitated on said lignocellulose as a minor constituent and a plasticizing agent.

7. A hard, dense, strong, water-resistant, dark-colored product molded under heat and pressure containing partially hydrolyzed lignocellulose material as its major component and a precipitated partially desulphonated lignin-sulphonic acid compound as a minor constituent and a plasticizing agent.

8. The process of treating lignocellulose material to make a product capable of being molded under heat and pressure in the presence of a plasticizer to form a product having high wet and dry strength and low water absorption which comprises digesting lignocellulose material under an elevated temperature and pressure with an alkaline aqueous solution containing a lignin-sulphonic acid compound and a predetermined amount of an alkaline material sufficient to be neutralized by the acids developed during the digestion and to permit of the attainment of an acidity in the digesting material in a range extending between about pH 4.0 to 6.5 for a relatively long portion of the total digestion period and to precipitate a partially desulphonated lignin-sulphonic acid compound during the digestion, the amount of the alkaline material being such that it is completely neutralized by the acids during the digestion in a relatively short portion of the total digestion time, washing and drying the resultant solid product.

9. The process of treating lignocellulose material to make a product capable of being molded under heat and pressure in the presence of a plasticizer to form a product having high wet and dry strength and low water absorption which comprises digesting lignocellulose material under an elevated temperature and pressure with an alkaline aqueous solution constaining a partially desulphonated lignin-sulphonic acid compound and a predetermined amount of caustic soda sufficient to be neutralized by the acids developed during the digestion and to permit of the attainment of an acidity in the digesting material in a range extending between about pH 4.0 to 6.5 for a relatively long portion of the total digestion period and to permit of the precipitation of a partially desulphonated lignin-sulphonic acid compound during the digestion, the amount of the alkaline material being such that it is completely neutralized by the acids developed during the digestion in a relatively short portion of the total digestion time, washing and drying the resultant solid product.

10. The process of treating lignocellulose material to make a product capable of being molded under heat and pressure in the presence of a plasticizer to form a product having high wet and dry strength and low water absorption which comprises digesting lignocellulose material under an elevated temperature and pressure with an alkaline aqueous solution containing a lignin-sulphonic acid compound and a predetermined amount of an alkaline material sufficient to be neutralized by the acids developed during the digestion and to permit of the attainment of an acidity in the digesting material in a range extending between about pH 4.0 to 7.0 for a relatively long portion of the total digestion period and to precipitate a partially desulphonated lignin-sulphonic acid compound during the digestion, the amount of the alkaline material being such that it is completely neutralized by the acids developed during the digestion in a relatively short portion of the total digestion time, washing and drying the resultant solid product.

JOHN G. MEILER.